United States Patent
Kubo (12)

(10) Patent No.: US 6,555,223 B2
(45) Date of Patent: *Apr. 29, 2003

(54) GRAPHITE STRUCTURE WITH INCREASED FLEXIBILITY

(75) Inventor: Akira Kubo, Stevenson Ranch, CA (US)

(73) Assignee: SGL Technic, Inc., Valencia, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/521,262

(22) Filed: Mar. 8, 2000

(65) Prior Publication Data

US 2002/0141933 A1 Oct. 3, 2002

(51) Int. Cl.[7] .................................................. B32B 9/00
(52) U.S. Cl. ....................................... 428/408; 428/409
(58) Field of Search ................................ 428/408, 409; 423/448, 460

(56) References Cited

U.S. PATENT DOCUMENTS

| 3,404,061 A | * | 10/1968 | Shane |
| 4,534,922 A | * | 8/1985 | Atkinson et al. ............ 264/119 |
| 4,752,518 A | | 6/1988 | Lohrke et al. |
| 5,992,857 A | * | 11/1999 | Ueda ........................... 277/592 |

* cited by examiner

Primary Examiner—Deborah Jones
Assistant Examiner—Abraham Bahta
(74) Attorney, Agent, or Firm—Blakely Sokoloff Taylor & Zafman, LLP

(57) ABSTRACT

An article of manufacture including a graphite sheet having a texturized surface. The article of manufacture comprises, in one embodiment, about 90 to 99 percent vermicular graphite and about 1 to 10 percent of a filler (e.g., talc or mica). The article of manufacture may also include an insert in the form of a sheet of, for example, stainless steel, polyester film, or fiberglass fabric. Also, a method including combining an article having a surface texture with a graphite sheet, and imparting the surface texture to a surface of the graphite sheet.

10 Claims, 3 Drawing Sheets

GRAPHITE STRUCTURE WITH INCREASED FLEXIBILITY

FIELD OF THE INVENTION

This invention relates to graphite articles and more particularly to graphite articles with increased flexibility.

BACKGROUND OF THE INVENTION

Graphite sheets are generally made from expanded vermicular particles which are compressed to form graphite-based sheets. Flakes of natural graphite are treated with an acid solution then the treated flakes are exposed to high temperature. This causes the graphite flakes to expand in a direction perpendicular to the crystal plane of graphite atoms (typically referred to in the industry as the "c" direction in crystallographic terminology). A form of a substantially flat, flexible, integrated graphite sheet is made by compressing expanded graphite particles which are at least 80 times that of the original particles under a predetermined load and in the absence of a binder. Each particle can be held together without a bonding element. The density and thickness of the sheet may be varied by controlling the degree of compression.

Graphite sheets can be used in many applications because of characteristics such as thermal and chemical stability, low electrical resistivity and low thermal expansion. However, the brittle and relatively low tensile strength of graphite sheets is one of the few disadvantages of the material. Various efforts have been made to improve the graphite sheet strength. One example is laminating a thin film of foreign material between graphite sheets. Although this method results in a sheet that has a higher tensile strength, the brittleness of the graphite is not affected and the material may exhibit cracks on the surface especially when the material is bent or rolled extensively. When graphite sheets are bent or rolled beyond normal handling conditions, cracks are generated on the sheet surface. Such cracks lead to breakage across the sheet. The cracking and breakage are dependent on the thickness of the sheet. Graphite sheets have some degree of flexibility especially with thin sheets (e.g., on the order of 0.03 inch or less sheet thickness). However, graphite sheets lose their flexibility as the thickness and density of the material increases. The thicker and denser the sheet, the more susceptible it is to the generation of cracks when bent or rolled. Because of this property, thick and dense graphite sheets are transported with flat crate packaging which is generally inefficient and not economical. What is needed is a graphite sheet and a method of making a graphite sheet with improved flexibility.

SUMMARY OF THE INVENTION

An article of manufacture is disclosed. In one embodiment, the article of manufacture comprises vermicular graphite of a sheet having a texturized surface. In another embodiment, the article of manufacture comprises about 90 to 99 percent graphite and about 1 to 10 percent of a filler (e.g., talc or mica). The article of manufacture may also include an insert in the form of a sheet of, for example, stainless steel, polyester film, or fiberglass fabric.

In another embodiment, a method is disclosed including combining an article having a surface texture with a graphite sheet, and imparting the surface texture to a surface of the graphite sheet.

Additional features, embodiments, and benefits will be evident in view of the figures and detailed description presented herein.

DETAILED DESCRIPTION OF THE INVENTION

The invention relates to an article of manufacture including a graphite sheet having a texturized surface. The sheet has improved flexibility over prior art sheets of similar thickness and density. A method of forming an article having a textured surface is also disclosed.

In one embodiment, graphite particles previously treated to expand in the "c" direction, are compacted and calendared. After compacting and calendaring into a sheet form, one or both primary surfaces of the sheet are texturized by, for example, calendaring with a harder material than graphite sheet including stainless steel mesh. The harder material transfers an imprinting pattern to the graphite sheet surface. Flexible graphite sheet is generally soft enough to result in a texturized pattern to be inscribed on its surface.

In one embodiment, the texturized pattern is uniform and continues across the surface to disperse applied stress and prevent stress from accumulating in any one particular area which could lead to the creation of a crack. It has been found that when graphite sheets without a texturized surface are bent beyond their flexibility limit, cracks are initiated along the surface in a direction orthogonal to the bending direction. It has also been found that when a texturized surface graphite sheet of thickness similar to the non-textured surface is bent, the sheet does not crack at the same arc that produced the crack in the non-textured sheet of similar thickness and density. One theory for this result is that, the minimum energy to create one crack can be dispersed over many grooves/ridges of the texturized surface. More energy is required to create a crack since the groove/ridge surface absorbs bending energy which leads to improved material flexibility.

Figure 1:
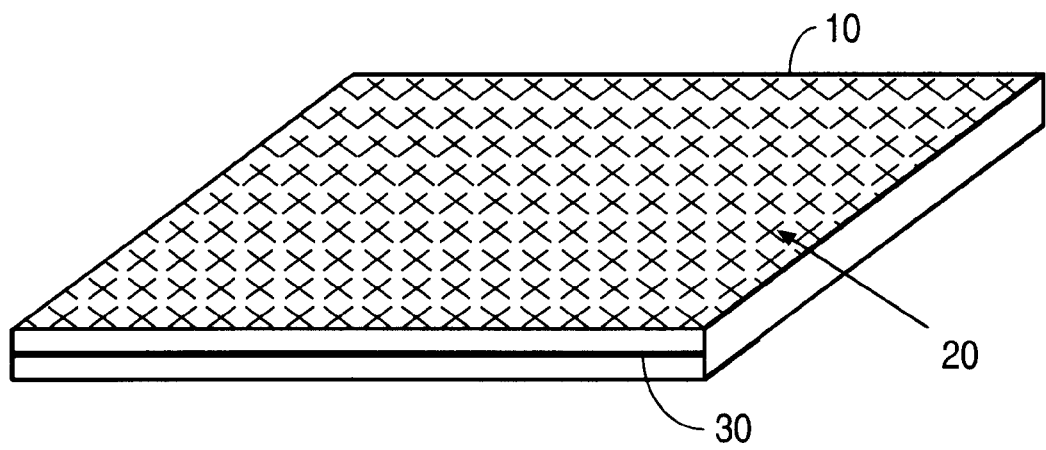
FIG. 1 is a top perspective cross-sectional view of a portion of a graphite sheet according to an embodiment of the invention.

FIG. 1 illustrates a top perspective view of a cross-section of an embodiment of an article of manufacture that is a texturized graphite-based sheet. Sheet 10 includes about 90 to 99 percent by weight of graphite. The article of manufacture also comprises about one to 10 percent of a filler such as talc or mica or a combination of talc and mica. The density of the graphite sheet can be in a range from about 44 to 100 lb/ft$^3$. In this instance, sheet 10 includes texturized pattern 20 of a repetitive cross grooved pattern across the graphite sheet. It is to be appreciated that this pattern could be a variety of configurations. This pattern can be solid perpendicular lines.

One advantage to the improved flexibility of textured sheets over non-textured sheet is that graphite sheets may be stored in a rolled form where sheet edges are protected in a rolled tube package that supports itself by being doubled over each layer.

In the embodiment of the article of manufacture of a sheet shown in FIG. 1, sheet 10 includes insert 30 that serves in one aspect to reinforce the article by laminating two graphite sheets on either side to form a composite article. Insert 30 may be, for example, stainless steel wire mesh, stainless steel sheet, stainless steel tang, polyester film and fiber glass fabric. A suitable insert thickness will depend on the desired thickness of the composite article. Examples of insert thickness include ranges of 0.02 inch to 0.075 inch.

Figure 2:
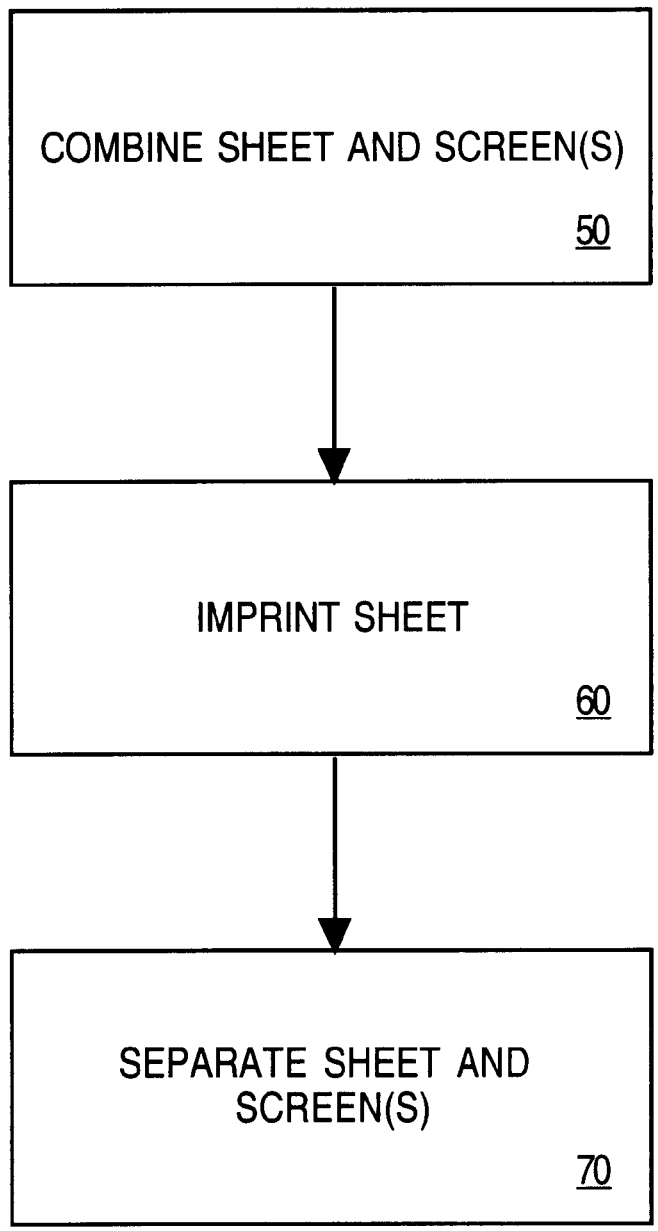
FIG. 2 is a flow chart of a method of forming a graphite sheet according to an embodiment of the invention.
Figure 3:
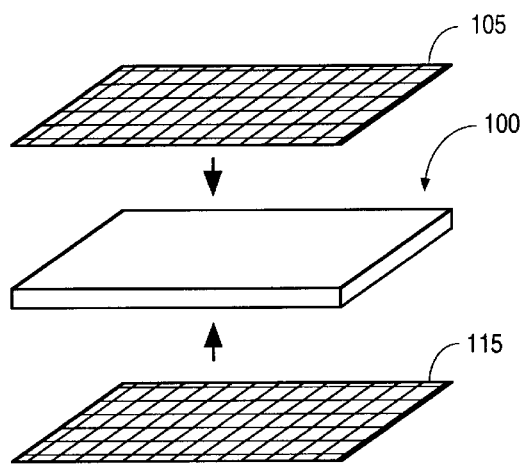
FIG. 3 is a top perspective view of a graphite sheet being combined with screens on opposing surfaces according to an embodiment of the invention.
Figure 4:
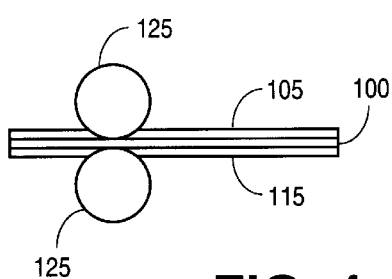
FIG. 4 is a side view of the combined sheet/screens of FIG. 3 undergoing a calendaring operation.
Figure 5:
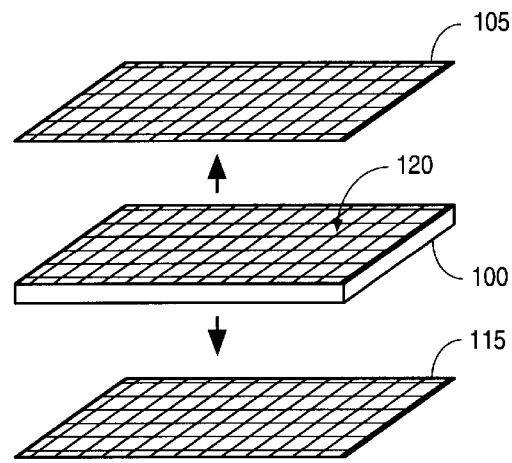
FIG. 5 is a top perspective view of the combined sheet/screens of FIG. 3 showing the screens removed.

One method to make a texturized graphite sheet according to the invention is shown in the flow chart of FIG. 2 and the illustrations of FIGS. 3–5. The method includes imprinting one or both sides of a graphite sheet (or a composite sheet of two graphite sheets and an insert) with a wire mesh screen having, for example, a sieve number of 100 (sieve opening 0.0059 inches and wire diameter 0.0043 inches) or greater (i.e., smaller sieve opening and wire diameter). Block 50 of FIG. 2 describes and FIG. 3 shows the combination of screen 105 and 115 assembled on opposing sides of sheet 100. In this example, screens 105 and 115 have dimensions similar to sheet 100 so that the area of screen 105 or screen 115 covers the surface area of sheet 100 leaving the edges of sheet 100 exposed.

Next, as shown in FIG. 4, the combined screen and sheet article is subjected to a calendaring operation (block 60) to imprint sheet 100 with the mesh pattern of screen 105 and screen 115. Calendaring may be carried out in a laminating and finishing type calendar, commercially available from Black Bros. of Mendosa, Ill. Sheets having a width on the order of 10 feet or greater are suitable depending upon the calendaring equipment. FIG. 4 shows the combined sheet being maneuvered through calendar rolls 125.

Once sheet 100 is imprinted with the mesh pattern of screens 105 and 115, the screens are separated from sheet 100 (block 70). FIG. 5 shows the separation.

One advantage of the texturized sheet of the invention is that the flexibility of the texturized sheet can be increased over a prior art sheet of similar thickness. Variations in the textured pattern or application to one or both sides may be used to modify the flexibility. For example, flexible graphite sheets with a preferred direction bending can be constructed by applying the texturizing imprint with solid or broken lines parallel to the bending direction.

EXAMPLE 1

In general, a typical 0.03 inch and less thickness graphite sheets can be rolled without cracks or breakage into a 3 inch diameter tube container. As thicknesses increase beyond 0.03 inches, such sheets cannot be rolled without cracking. Texturized sheets imprinted on both sides with a 100 mesh or greater pattern and having a thickness of approximately 0.06 inches can be rolled into a 3 inch tube container. Furthermore, similarly texturized graphite sheets having a 0.080 inch thickness can be rolled into 4 inch diameter tube container, and 0.125 inch thickness sheet can be rolled into 12 inch diameter tube container.

EXAMPLE II

In this example, graphite sheets having an insert (i.e., composite sheets) with 0.060 inch thickness and 70 lb/ft$^3$ density are slit into tapes with dimensions 0.5 inch width×6 inch length and the minimum diameter to roll the tape around a mandrill is determined before the sheet generates a crack on its surface. This test is conducted according to ASTM F147-87 standard. The test results are shown in Table 1.

| | Insert Type | | |
|---|---|---|---|
| Surface finish | None | Stainless steel were mesh | Polyester film |
| No texturizing | >4.00 inch | 3.15 inch | >4.00 inch |
| With texturizing | 2.06 inch | 1.88 inch | 1.31 inch |

The above description has focused on articles of manufacture that are graphite sheets. It is to be appreciated that the principles of the invention can be incorporated into other graphite-based structures.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An article of manufacture comprising:

a graphite sheet having a texture inscribed on a surface of the graphite sheet wherein the graphite sheet has a thickness of at least 0.05 inches and can be wrapped around a mandrill with a minimum diameter of less than approximately 2.1 inches in compliance with ASTM F147-87 standard.

2. The article of manufacture of claim 1, wherein the texturized surface comprises a uniform pattern.

3. The article of manufacture of claim 2, wherein the texturized surface comprises a plurality of equally spaced ridges.

4. The article of manufacture of claim 2, wherein the texturized surface comprises a mesh pattern.

5. The article of manufacture of claim 2, wherein the mesh pattern is equivalent to a screen mesh of at least 100.

6. The article of manufacture of claim 1, wherein the sheet has a second texturized surface.

7. The article of manufacture of claim 1, further comprising a filler of one of talc and mica, wherein the article of manufacture comprises:

about 90 to 99 percent by weight graphite; and about 1 to 10 percent of a filler of at least one of talc and mica.

8. The article of manufacture of claim 7, further comprising an insert in the form of a sheet, the graphite and filler at least overlying opposing surfaces of the sheet.

9. The article of manufacture of claim 8, wherein the insert comprises a material of one of stainless steel, polyester and glass fabric.

10. The article of manufacture of claim 1, wherein the texturized surface comprises:

a calendared surface.

* * * * *